(12) United States Patent
Unrau

(10) Patent No.: US 11,507,938 B1
(45) Date of Patent: Nov. 22, 2022

(54) PREPAID CARD FUNDING FOR SINGLE TRANSACTION

(71) Applicant: Worldpay, LLC, Symmes Township, OH (US)

(72) Inventor: Jackson Andrew Unrau, Littleton, CO (US)

(73) Assignee: WORLDPAY, LLC, Symmes Township, OH (US)

( * ) Notice: Subject to any disclaimer, the term of this patent is extended or adjusted under 35 U.S.C. 154(b) by 0 days.

(21) Appl. No.: 16/235,311

(22) Filed: Dec. 28, 2018

(51) Int. Cl.
| | | |
|---|---|---|
| *G06Q 20/00* | (2012.01) | |
| *G06Q 20/34* | (2012.01) | |
| *G06Q 20/28* | (2012.01) | |
| *G06Q 20/40* | (2012.01) | |

(52) U.S. Cl.
CPC ............ *G06Q 20/349* (2013.01); *G06Q 20/28* (2013.01); *G06Q 20/354* (2013.01); *G06Q 20/356* (2013.01); *G06Q 20/401* (2013.01)

(58) Field of Classification Search
CPC ........ G06Q 20/00; G06Q 40/00; G06Q 20/20; G06Q 30/0255; G06Q 30/351; G06Q 20/342
See application file for complete search history.

(56) References Cited

U.S. PATENT DOCUMENTS

| | | | | | |
|---|---|---|---|---|---|
| 2003/0046249 | A1* | 3/2003 | Wu | ............................ | G07F 7/02 705/79 |
| 2008/0243689 | A1* | 10/2008 | Pinnell | ................. | G06Q 20/108 705/42 |
| 2010/0228672 | A1* | 9/2010 | Karim | .................... | G06Q 20/40 705/44 |
| 2012/0150731 | A1* | 6/2012 | Isaacson | ................ | G06Q 50/01 705/39 |
| 2014/0081839 | A1* | 3/2014 | Blackhurst | ........... | G06Q 20/342 705/39 |
| 2014/0249904 | A1* | 9/2014 | Nelsen | ................. | G06Q 20/351 705/14.23 |
| 2015/0269553 | A1* | 9/2015 | Barrett | ................... | G06Q 20/28 705/39 |
| 2016/0189213 | A1* | 6/2016 | Gopalan | ........... | G06Q 30/0255 705/14.53 |

(Continued)

OTHER PUBLICATIONS

NetBill: An Internet Commerce System Optimized for Network—Delivered Services by MArvin Sirbu and J.D.Tygar (Year: 1995).*

(Continued)

*Primary Examiner* — Bruce I Ebersman
*Assistant Examiner* — John A Anderson
(74) *Attorney, Agent, or Firm* — Bookoff McAndrews, PLLC

(57) ABSTRACT

A computer-implemented method for prepaid card funding for a single transaction includes receiving, from a client, a request for funding a single transaction using a payment vehicle, providing funds for the single transaction with the payment vehicle, notifying the client that the funds are available for the single transaction with the payment vehicle, receiving notification from the client that the single transaction with the payment vehicle has been completed, and unloading remaining funds from the payment vehicle, such that no funds remain with the payment vehicle.

11 Claims, 5 Drawing Sheets

(56) References Cited

U.S. PATENT DOCUMENTS

2017/0228674 A1* 8/2017 Budde ................ G06Q 10/0635
2017/0352021 A1* 12/2017 Szeto ................ G06Q 20/3223

OTHER PUBLICATIONS

Integration of new electronic payment systems into B2C internet commerce Published in: 2011 International Conference on Collaboration Technologies and Systems (CTS) (pp. 484-491) Authors: Abdellaoui, R. • Pasquet, M. • Berthelier, O. (Year: 2011).*

* cited by examiner

PREPAID CARD FUNDING FOR SINGLE TRANSACTION

TECHNICAL FIELD

Various embodiments of the present disclosure relate generally to pre-paid payment processing and, more particularly, to prepaid card funding for a single transaction.

BACKGROUND

In a typical prepaid card purchase, the consumer must have a balance on the prepaid card equal to or greater than the cost of the item or service to be purchased. The balance on the prepaid card may be provided by the consumer transferring funds from another financial account or may be provided by a merchant, service provider, or other commercial entity as, for example, a promotion, a refund from a prior transaction, or as a form of payment for a transaction, etc. In some cases, the commercial entity may wish to fund a purchase for a consumer using the prepaid card. This may be accomplished by the commercial entity loading funds on the consumer's prepaid card to fund the desired purchase. However, funding a single purchase in this manner may lead to misuse of the funds if the consumer uses the card at a retailer other than the intended retailer, fails to use the card for the intended purchase, or uses the card for an unauthorized purchase. In addition, in some cases the actual purchase cost may be less than that expected by the commercial entity, resulting in a remaining funds balance. Thus, there is a need for a prepaid card solution that allows for single transaction funding at a specified retailer for a specified purchase and that ensures that the consumer's prepaid card is left with a zero balance after the transaction.

The present disclosure is directed to overcoming one or more of these above-referenced challenges.

SUMMARY OF THE DISCLOSURE

According to certain aspects of the present disclosure, systems and methods are disclosed for prepaid card funding for a single transaction.

In one embodiment, a computer-implemented method is disclosed for prepaid card funding for a single transaction, the method comprising: receiving, from a client, a request for funding a single transaction using a payment vehicle, providing funds for the single transaction with the payment vehicle, notifying the client that the funds are available for the single transaction with the payment vehicle, receiving notification from the client that the single transaction with the payment vehicle has been completed, and unloading remaining funds from the payment vehicle, such that no funds remain with the payment vehicle.

In accordance with another embodiment, a system is disclosed for prepaid card funding for a single transaction, the system comprising: a data storage device storing instructions for prepaid card funding for a single transaction in an electronic storage medium; and a processor configured to execute the instructions to perform a method including: receiving, from a client, a request for funding a single transaction using a payment vehicle, providing funds for the single transaction with the payment vehicle, notifying the client that the funds are available for the single transaction with the payment vehicle, receiving notification from the client that the single transaction with the payment vehicle has been completed, and unloading remaining funds from the payment vehicle, such that no funds remain with the payment vehicle.

In accordance with another embodiment, a non-transitory machine-readable medium storing instructions that, when executed by the computing system, causes the computing system to perform a method for prepaid card funding for a single transaction, the method including: receiving, from a client, a request for funding a single transaction using a payment vehicle, providing funds for the single transaction with the payment vehicle, notifying the client that the funds are available for the single transaction with the payment vehicle, receiving notification from the client that the single transaction with the payment vehicle has been completed, and unloading remaining funds from the payment vehicle, such that no funds remain with the payment vehicle.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to prepaid card funding for a single transaction.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

For simplicity, the description that follows will be provided by reference to a "payment vehicle" or a "prepaid card," which generally refers to any type of alternative to currency. As is to be clear to those skilled in the art, payment vehicles or payment cards can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, prepaid or stored-value cards, electronic benefit transfer cards, electronic currency or electronic wallets (such as might be provided through a cellular telephone or personal digital assistant) or any other like financial transaction instrument.

Figure 2:
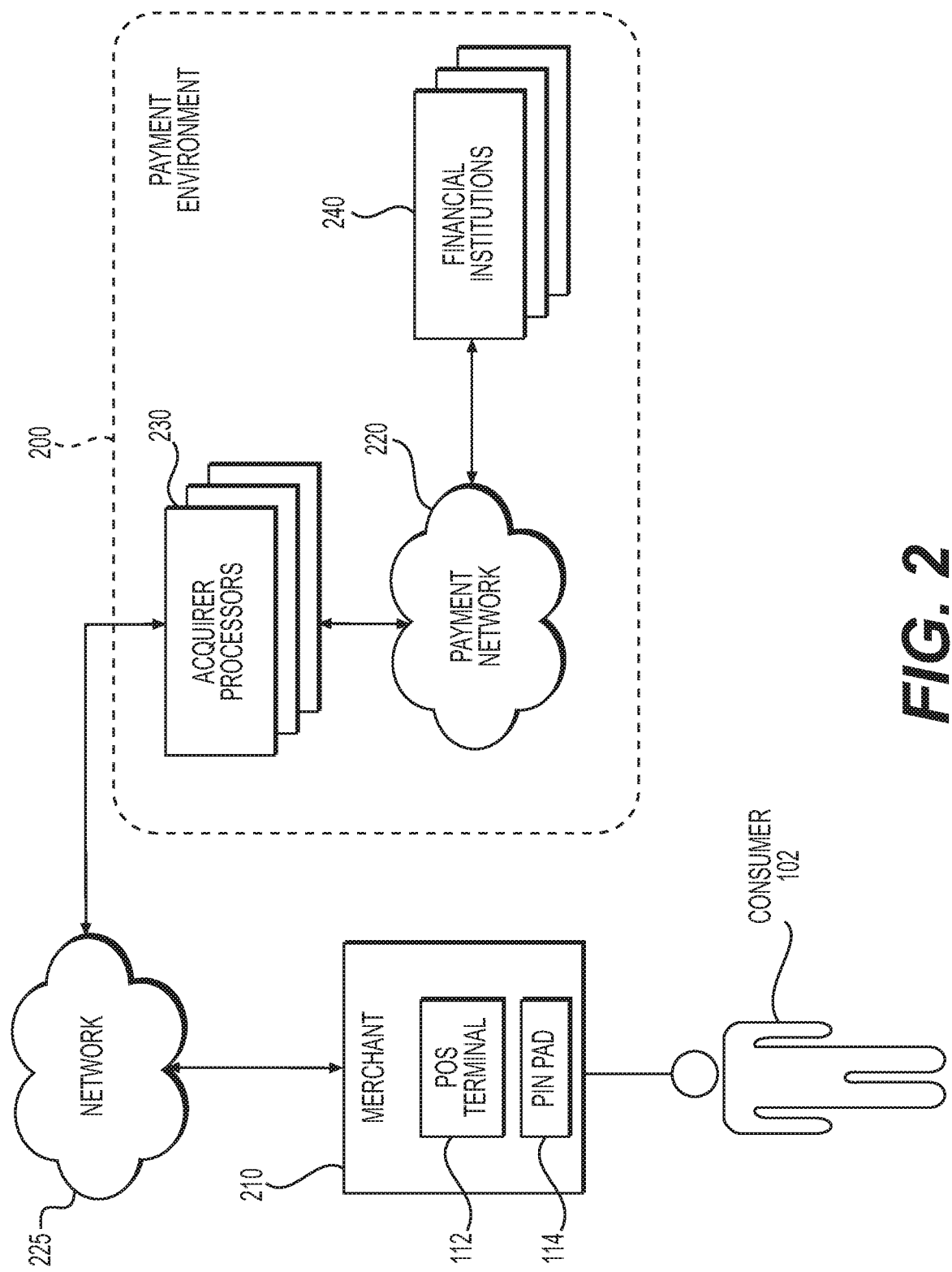
FIG. 2 depicts an exemplary system infrastructure for prepaid card transaction processing, according to one or more embodiments.
Figure 4:
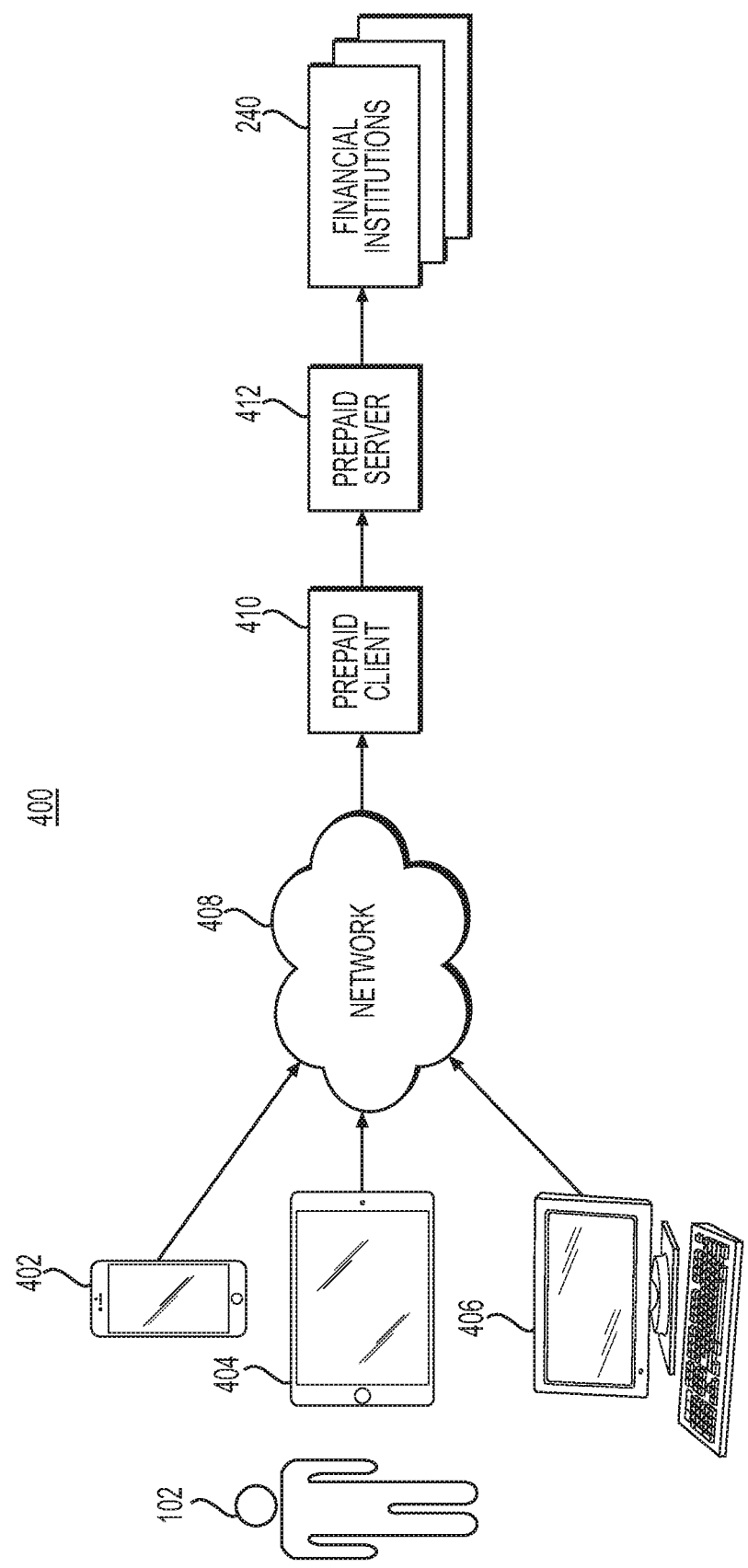
FIG. 4 depicts an exemplary system infrastructure for prepaid card funding for a single transaction, according to one or more embodiments.

Any suitable system infrastructure may be put into place to allow user control of an interactive audiovisual environment, and engagement assessment. FIGS. 2 and 4 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIGS. 2 and 4. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Figure 1:
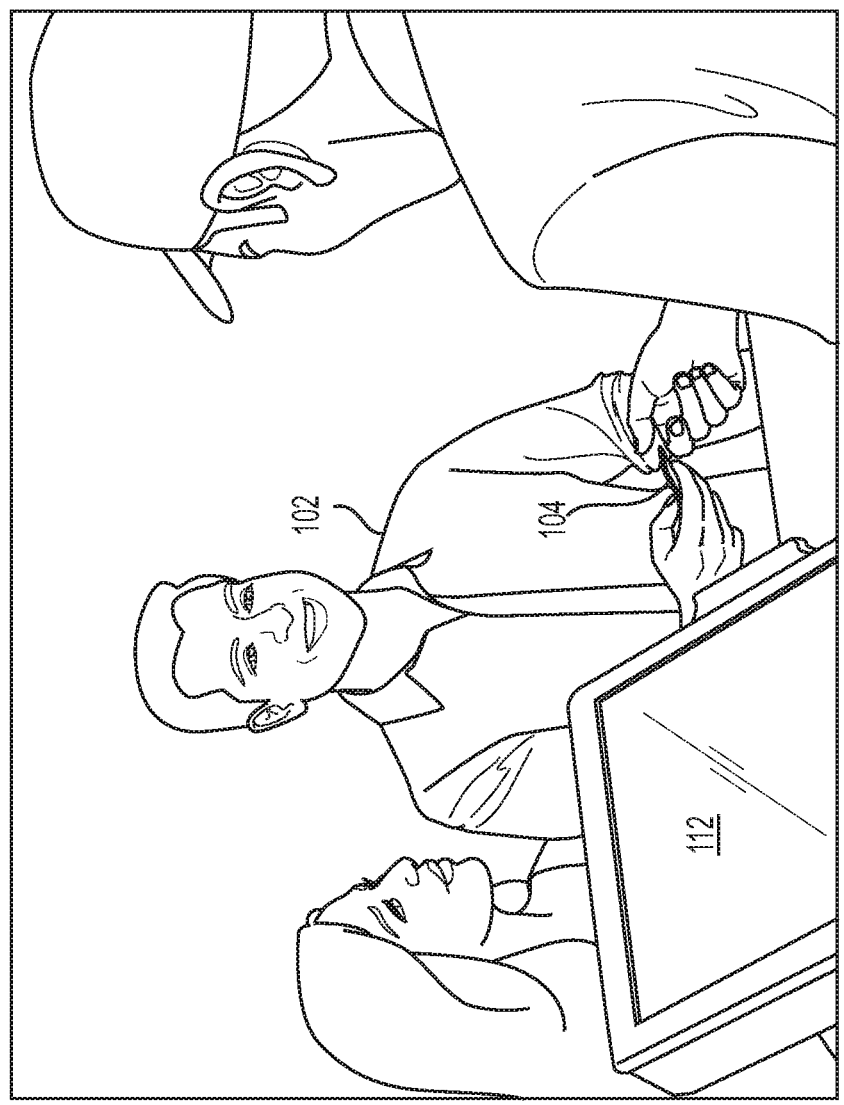
FIG. 1 depicts an exemplary use scenario for prepaid card funding for a single transaction, according to one or more embodiments.

FIG. 1 depicts an exemplary use scenario for prepaid card funding for a single transaction, according to one or more embodiments. In some scenarios, a service provider may wish to provide products or services to consumers on behalf of retailers. For example, a service provider may sell admissions to a movie on behalf of the theater owner. The product or service may be provided to the consumer at a discounted rate or may be provided as part of a membership or under an annual or monthly fee. The service provider may obtain the product or service from the retailer at a reduced cost. As shown in FIG. 1, cardholder 102 may present a payment card, such as prepaid card 104, at a merchant, such as a movie theater box office. Here cardholder 102 presents prepaid card 104 to pay for movie tickets after a service provider has loaded funds on prepaid card 104 matching the cost of the tickets.

FIG. 2 depicts an exemplary system infrastructure for prepaid card transaction processing, according to one or more embodiments. As shown in FIG. 2, in a prepaid card transaction processing system, a consumer 102, during the checkout process with a merchant 110, pays for goods or services from merchant 210 through a POS terminal 112, such as, for example, at a PIN pad 114 associated with POS terminal 112. Consumer 102 may use a payment card, such as prepaid card 104 depicted in FIG. 1, as payment and the transaction is processed through a payment environment 100. Because merchant 210 generally can use a different bank or financial institution 240 than consumer 102, an acquirer processor 230 handles the financial transactions that transfer payment between the financial institution 240 of consumer 102 and that of merchant 210. If required, consumer 102 may submit payment information at the PIN pad 114 associated with POS terminal 112 of merchant 110, such as by swiping his or her payment card, inserting his or her chip-based payment card, through wireless near field communication (NFC), etc., or by any other suitable means. Merchant 210 sends a payment request by way of a computer network 225 to an acquirer processor 230. Such a payment request maybe sent by PIN pad 114 or POS terminal 112. Acquirer processor 230 requests, by way of payment network 220, an electronic transfer of funds from the received funds to the financial institution 240 associated with merchant 210.

The payment card presented by consumer 102 may be a credit card in which charges are made against a line of credit instead of the account holder's cash deposits. When consumer 102 uses a credit card to make a purchase, the account linked to the credit card accrues a balance that must be paid off each month. Failure to pay off the credit card on time may result in interest charges and late fees. Alternatively, the payment card may be a debit card, which is used to make purchases with funds in a deposit account associated with the debit card. Debit cards grew out of check cards, a financial instrument meant to replace writing checks for purchases, and may be used in lieu of cash at any retailer that accepts them. Unlike credit cards, which are not tied to cash deposits, a debit card can only be used if the associated deposit account contains sufficient funds. Finally, the payment card may be a prepaid card resembling a standard credit card, but which works like a debit card. Funds must be front-loaded on the prepaid card first before the prepaid card can be used for purchases. The balance on the prepaid card may be provided by the consumer transferring funds from another financial account or may be provided by a merchant or other commercial entity as, for example, a promotion, a refund from a prior transaction, or as a form of payment for a transaction, etc.

Merchant 210, acquirer processor 230, and/or a service provider (not shown) may provide an infrastructure for prepaid card funding for a single transaction. FIGS. 2 and 4 depict an exemplary system infrastructure for prepaid card funding for a single transaction, according to one or more embodiments.

FIG. 4 depicts an exemplary system infrastructure for prepaid card funding for a single transaction, according to one or more embodiments. As shown in FIG. 4, consumer 102 may user a mobile device, such as mobile phone 402 or tablet 404, an application running on desktop or laptop computer 406, or a website accessed through a web browser running on desktop or laptop computer 406 to access prepaid client 410 by way of computer network 408. Computer network 408 may be a communications network, such as a Local Area Network ("LAN"), Wide Area Network ("WAN"), and/or the Internet, and may include one or more wireless networks. Prepaid client 410 may provide application programming interfaces (APIs), web page-based interfaces, or other interfaces for requesting funding of a single-use transaction using a prepaid card 104 held by consumer 102 and managed by prepaid client 410. For example, consumer 102 may hold an account with a service provider that provides free or reduced-price movie tickets by way of a prepaid card 104. Prepaid client 410 may interact with prepaid server 412 to provide funding to prepaid card 104 to cover the cost of completing a requested transaction. Prepaid server 412 may provide application programming interfaces (APIs) or other interfaces for requesting funding and authorization of a single transaction. Prepaid server 412 may interact with one or more financial institutions 240 to transfer funds between a financial institution and a financial account linked to prepaid card 104. Prepaid client 410 and prepaid server 412 may reside at an acquirer processor 230, a financial institution 240, a service prodder, or may be provided by another entity. Prepaid client 410 and prepaid server 412 may reside together or may reside separately.

Figure 3:
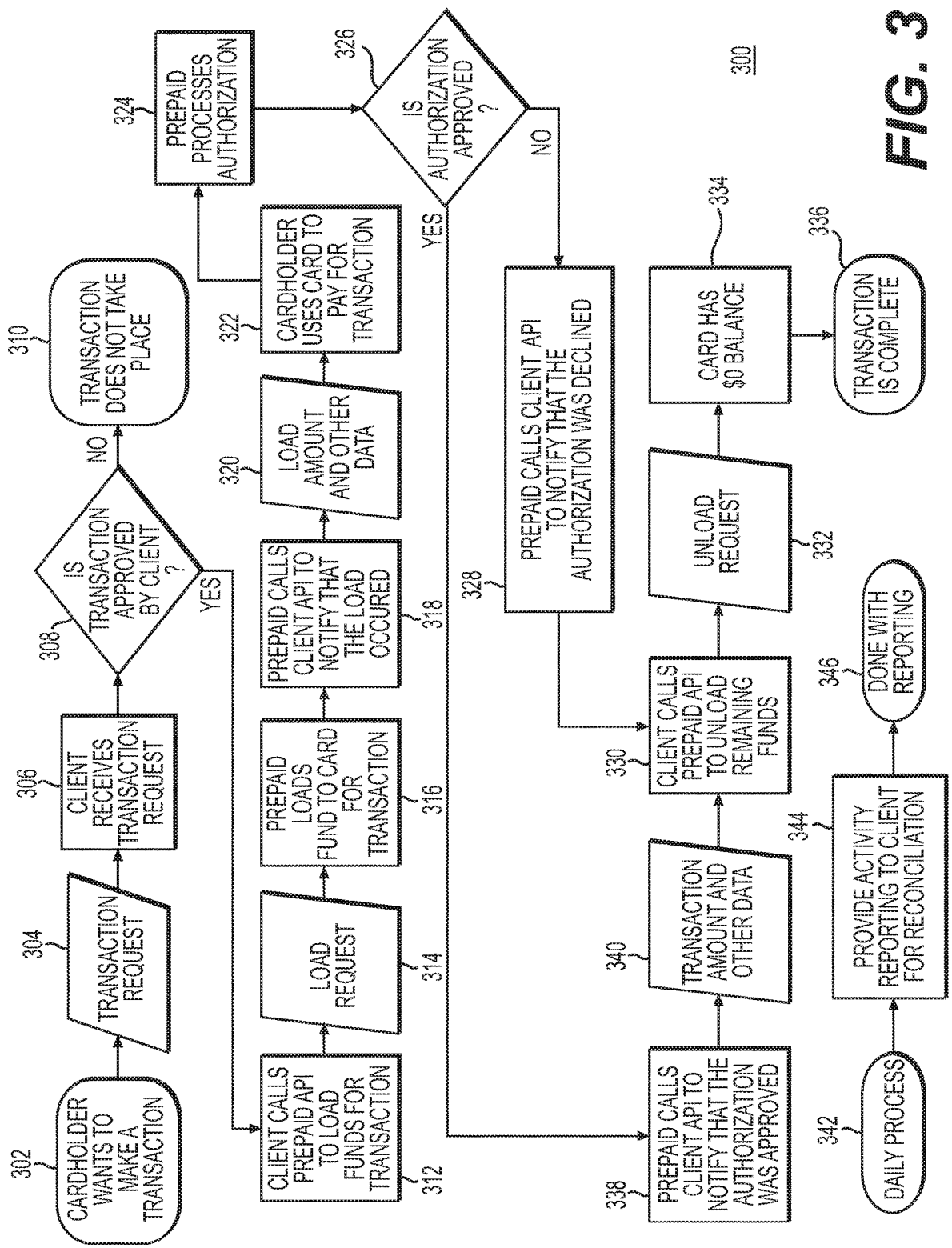
FIG. 3 depicts a flowchart of a method of prepaid card funding for a single transaction, according to one or more embodiments.

FIG. 3 depicts a flowchart of a method of prepaid card funding for a single transaction, according to one or more embodiments. As shown in FIG. 3, at operation 302, cardholder 102 may decide to make a prepaid transaction, such as, for example, purchasing movie tickets. Cardholder 102 may send a transaction request 304 to prepaid client 410. The transaction request may be sent, for example, by way of a an application running on a mobile device, such as mobile phone 402 or tablet 404, an application running on desktop or laptop computer 406, or a website accessed through a web browser running on desktop or laptop computer 406. At operation 306, prepaid client 410 may receive transaction request 304. At operation 308, prepaid client 410 may determine whether transaction request 304 is approved.

The transaction may be disapproved as the result of prepaid client 410 determining that cardholder 102 is not eligible to complete the requested transaction. For example, an account associated with cardholder 102 may be expired, inactive, or nonexistent. In addition, prepaid client 410 may apply one or more rules to the transaction, such as may be provided by a rules engine (not shown). In particular, a service provider associated with prepaid card 104 may wish to limit the use of funds loaded onto prepaid card 104. For example, the service provider may wish to limit the use to a certain type of merchant or service provider, such as, for example, by merchant category code (MCC), at a particular merchant such as, for example, by a merchant identifier (MID), at limited location, such as, for example, within a geofence radiating a predetermined radius from a desired location, at a limited time, such as within a predetermined window of time, or for a particular product or service. For example, the service provider may wish to limit the use of available funds to the purchase of an admission to a particular movie at particular time at a particular theater. Attempts to use the funds for any other purpose may result in the disapproval of the requested transaction.

If the transaction request is not approved, then at operation 310, the transaction may be denied by prepaid client 410 and the transaction may be terminated. If transaction 304 is approved by prepaid client 410, then at operation 312, prepaid client 410 may call a method of the application programming interface (API) of prepaid server 412 to load funds to enable transaction 304. The API may generate a load funds request 314 for processing by prepaid server 412. At operation 316, prepaid server 412 may load funds onto an account associated with the payment vehicle presented by consumer 102. For example, prepaid server 412 may load funds onto prepaid card 104. At operation 318, prepaid server 412 may notify prepaid client 410 that funds have been loaded onto the payment vehicle. For example, prepaid server 412 may transmit the amount of funds loaded onto the payment vehicle, and other data, to prepaid client 410 as data 320. At operation 322, consumer may present payment vehicle 104 to the merchant POS system 112 to complete the transaction by way of a point of sale (POS) system 112 at a retailer, such as, for example, a ticket purchase at a movie theater box office or kiosk. For example, cardholder 102 may present a prepaid payment vehicle, such as prepaid card 104, at a merchant's POS system 112. At operation 324, prepaid server 412 may process an authorization request for the transaction. At operation 326, prepaid server 412 may determine whether the authorization request is approved. If prepaid server 412 determines that the authorization request is not approved, then at operation 328, prepaid server 412 may notify prepaid client 410 that the authorization was declined.

The declined transaction may be the result of consumer 102 terminating the transaction or failing to present payment vehicle 104 at merchant's POS system 112. After notification of the declined transaction, at operation 330, prepaid client 410 may notify prepaid server 412 to unload any remaining funds on the consumer's payment vehicle, such as by calling the API of prepaid server 412 with unload request 332. As a result, at operation 334, the consumer's payment vehicle 104 may have a zero balance, and at operation 336, the transaction may be complete. If prepaid server 412 determines that the authorization request is approved, then at operation 338, prepaid server 412 may notify prepaid client 410 that the authorization was approved. The notification may include transaction data 340. Transaction data 340 may include, for example, a transaction amount and other data related to the transaction. At operation 330, prepaid client 410 may notify prepaid server 412 to unload any remaining funds on the consumer's payment vehicle, such as by calling the API of prepaid server 412 with unload request 332. As a result, at operation 334, the consumer's payment vehicle 104 may have a zero balance, and at operation 336, the transaction may be complete. Alternatively, prepaid server 412 may automatically unload any remaining funds on the consumer's payment vehicle at the conclusion of the transaction without any further request from prepaid client 410. Prepaid server 412 may further check the balance available on the consumer's payment vehicle 104 at regular intervals and unload any remaining funds on the consumer's payment vehicle in there are no pending transactions for payment vehicle 104.

Transactions based on operations 302 through 336 above may be completed many times each day, week, month, or year. A service provider may wish to receive reports detailing transactions completed or initiated during a period. Such reports may be used, for example, for financial reporting or for auditing, such as allowing the service provider to reconcile requested transactions with transactions that were completed. As shown in FIG. 3, at operation 342, a periodic process, such as a daily process, may initiate generation of desired reports. At operation 344, activity reports for the desired periods may be provided to the service provider, and at operation 346, the reporting process may be terminated.

Figure 5:
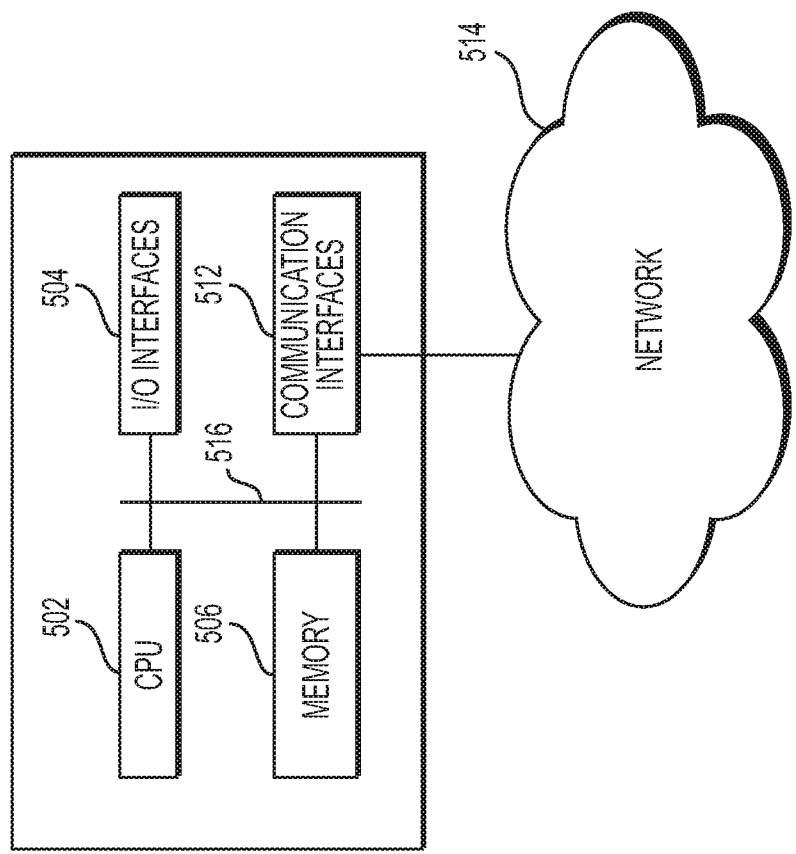
FIG. 5 is a block diagram of an example computing environment, according to one or more embodiments.

The systems and processes described above may be performed on or between one or more computing devices. FIG. 5 illustrates an example computing device. A computing device 500 may be a server, a computing device that is integrated with other systems or subsystems, a mobile computing device such as a smart phone, a cloud-based computing ability, and so forth. The computing device 500 may be any suitable computing device as would be understood in the art, including without limitation, a custom chip, and embedded processing device, a tablet computing device, a POS terminal associated with the merchant 110, a back-office system of a merchant 110, a personal data assistant (PDA), a desktop, laptop, microcomputer, and minicomputer, a server, a mainframe, or any other suitable programmable device. In various embodiments disclosed herein, a single component may be replaced by multiple components and multiple components may be replaced by single component to perform a given function or functions. Except where such substitution would not be operative, such substitution is within the intended scope of the embodiments.

The computing device 500 includes a processor 502 that may be any suitable type of processing unit, for example a general-purpose central processing unit (CPU), a reduced instruction set computer (RISC), a processor that has a pipeline or multiple processing capability including having multiple cores, a complex instruction set computer (CISC), a digital signal processor (DSP), application specific integrated circuits (ASIC), a programmable logic devices (PLD), and a field programmable gate array (FPGA), among others. The computing resources may also include distributed computing devices, cloud computing resources, and virtual computing resources in general.

The computing device 500 also includes one or more memories 506, for example read-only memory (ROM), random access memory (RAM), cache memory associated with the processor 502, or other memory such as dynamic RAM (DRAM), static RAM (SRAM), programmable ROM (PROM), electrically erasable PROM (EEPROM), flash memory, a removable memory card or disc, a solid-state drive, and so forth. The computing device 500 also includes storage media such as a storage device that may be configured to have multiple modules, such as magnetic disk drives, floppy drives, tape drives, hard drives, optical drives and media, magneto-optical drives and media, compact disk drives, Compact Disc Read Only Memory (CD-ROM), compact disc recordable (CD-R), Compact Disk Rewritable (CD-RW), a suitable type of Digital Versatile Disc (DVD) or BluRay disc, and so forth. Storage media such as flash drives, solid-state hard drives, redundant array of individual discs (RAID), virtual drives, networked drives and other memory means including storage media on the processor 502, or memories 506 are also contemplated as storage devices. It may be appreciated that such memory may be internal or external with respect to operation of the disclosed embodiments. It may be appreciated that certain portions of the processes described herein may be performed using instructions stored on a computer readable medium or media that direct computer system to perform the process steps. Non-transitory computable-readable media, as used herein, comprises all computer-readable media except for transitory, propagating signals.

Networking communication interfaces 512 may be configured to transmit to, or receive data from, other computing devices 500 across a network 514. The network and communication interfaces 512 may be an Ethernet interface, a radio interface, a Universal Serial Bus (USB) interface, or any other suitable communications interface and may include receivers, transmitter, and transceivers. For purposes of clarity, a transceiver may be referred to as a receiver or a transmitter when referring to only the input or only the output functionality of the transceiver. Example communication interfaces 512 may include wire data transmission links such as Ethernet and TCP/IP. The communication interfaces 512 may include wireless protocols for interfacing with private or public networks 514. For example, the network and communication interfaces 512 and protocols may include interfaces for communicating with private wireless networks such as Wi-Fi network, one of the IEEE 802.11x family of networks, or another suitable wireless network. The network and communication interfaces 512 may include interfaces and protocols for communicating with public wireless networks 512, using for example wireless protocols used by cellular network providers, including Code Division Multiple Access (CDMA) and Global System for Mobile Communications (GSM). A computing device 500 may use network and communication interfaces 512 to communicate with hardware modules such as a database or data store, or one or more servers or other networked computing resources. Data may be encrypted or protected from unauthorized access.

In various configurations, the computing device 500 may include a system bus 516 for interconnecting the various components of the computing device 500, or the computing device 500 may be integrated into one or more chips such as programmable logic device or application specific integrated circuit (ASIC). The system bus 516 may include a memory controller, a local bus, or a peripheral bus for supporting input and output devices 504, and communication interfaces 512. Example input and output devices 504 include keyboards, keypads, gesture or graphical input devices, motion input devices, touchscreen interfaces, one or more displays, audio units, voice recognition units, vibratory devices, computer mice, and any other suitable user interface.

The processor 502 and memory 506 may include non-volatile memory for storing computable-readable instructions, data, data structures, program modules, code, microcode, and other software components for storing the computer-readable instructions in non-transitory computable-readable mediums in connection with the other hardware components for carrying out the methodologies described herein. Software components may include source code, compiled code, interpreted code, executable code, static code, dynamic code, encrypted code, or any other suitable type of code or computer instructions implemented using any suitable high-level, low-level, object-oriented, visual, compiled, or interpreted programming language.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for prepaid card funding for a single transaction for a service provider to provide a product or service to a consumer on behalf of a retailer, the method comprising:
performing, by at least one processor of the computer, operations including:
receiving, at a prepaid card server, a request from a consumer device for a merchant server to fund a single transaction for a purchase of goods or services by the consumer using a payment vehicle;
determining, by the prepaid card server, whether the received request for the single transaction is approved, by determining whether the received request is allowed by one or more rules associated with the payment vehicle, wherein the one or more rules restrict authorization of the received request according to at least one of a type of merchant or service provider, a particular merchant or service provider, a location, a predetermined window of time, or a predetermined product or service;
based on the determining indicating the received request is not approved, notifying a prepaid card client that the single transaction with the payment vehicle was declined;
based on the determining indicating the received request is approved:
loading, by the prepaid card server, funds for the single transaction to the payment vehicle for single transaction funding at a specified retailer for a specified purchase;
notifying, by the prepaid card server and prior to the consumer presenting the payment vehicle to the specified retailer for the single transaction, the prepaid card client that the loaded funds are available for the single transaction with the payment vehicle;
receiving notification from the prepaid card client that the single transaction with the payment vehicle has been completed; and
unloading, by the prepaid card server at the completion of the single transaction, remaining funds from the payment vehicle, such that no funds remain with the payment vehicle and the payment vehicle has a zero balance, wherein the unloading is performed independent of whether an authorization for the single transaction is approved or declined;
determining whether a pending payment request exists for the payment vehicle; and
upon determining that a pending payment request does not exist for the payment vehicle, unloading, by the prepaid card server, remaining funds from the payment vehicle, such that no funds remain with the payment vehicle.

2. The computer-implemented method of claim 1, wherein the unloading remaining funds from the payment vehicle is performed prior to receiving notification from the prepaid card client that the single transaction with the payment vehicle has been completed.

3. The computer-implemented method of claim 1, further comprising:
generating a report of transactions completed or initiated during a specified period of time.

4. The computer-implemented method of claim 1, wherein the unloading the remaining funds unloads non-zero remaining funds from the payment vehicle such that no funds remain with the payment vehicle.

5. A system for prepaid card funding for a single transaction for a service provider to provide a product or service to a consumer on behalf of a retailer, the system comprising:
a data storage device storing instructions for prepaid card funding for a single transaction in an electronic storage medium; and
a processor configured to execute the instructions to perform a method including:
receiving, at a prepaid card server, a request from a consumer device for a merchant server to fund a single transaction for a purchase of goods or services by the consumer using a payment vehicle;
determining, by the prepaid card server, whether the received request for the single transaction is approved, by determining whether the received request is allowed by one or more rules associated with the payment vehicle, wherein the one or more rules restrict authorization of the received request according to at least one of a type of merchant or service provider, a particular merchant or service provider, a location, a predetermined window of time, or a predetermined product or service;
based on the determining indicating the received request is not approved, notifying a prepaid card client that the single transaction with the payment vehicle was declined;
based on the determining indicating the received request is approved:
loading, by the prepaid card server, funds for the single transaction to the payment vehicle for single transaction funding at a specified retailer for a specified purchase;
notifying, by the prepaid card server and prior to the consumer presenting the payment vehicle to the specified retailer for the single transaction, the prepaid card client that the loaded funds are available for the single transaction with the payment vehicle;
receiving notification from the prepaid card client that the single transaction with the payment vehicle has been completed; and
unloading, by the prepaid card server at the completion of the single transaction, remaining funds from the payment vehicle, such that no funds remain with the payment vehicle and the payment vehicle has a zero balance, wherein the unloading is performed independent of whether an authorization for the single transaction is approved or declined;
determining whether a pending payment request exists for the payment vehicle; and
upon determining that a pending payment request does not exist for the payment vehicle, unloading, by the prepaid card server, remaining funds from the payment vehicle, such that no funds remain with the payment vehicle.

6. The system of claim 5, wherein the unloading remaining funds from the payment vehicle is performed prior to receiving notification from the prepaid card client that the single transaction with the payment vehicle has been completed.

7. The system of claim 5, the system is further configured for:
generating a report of transactions completed or initiated during a specified period of time.

8. A non-transitory machine-readable medium storing instructions that, when executed by a computing system, causes the computing system to perform a method for prepaid card funding for a single transaction for a service provider to provide a product or service to a consumer on behalf of a retailer, the method including:

receiving, at a prepaid card server, a request from a consumer device for a merchant server to fund a single transaction for a purchase of goods or services by the consumer using a payment vehicle;

determining, by the prepaid card server, whether the received request for the single transaction is approved, by determining whether the received request is allowed by one or more rules associated with the payment vehicle, wherein the one or more rules restrict authorization of the received request according to at least one of a type of merchant or service provider, a particular merchant or service provider, a location, a predetermined window of time, or a predetermined product or service;

based on the determining indicating the received request is not approved, notifying a prepaid card client that the single transaction with the payment vehicle was declined;

based on the determining indicating the received request is approved:

loading, by the prepaid card server, funds for the single transaction to the payment vehicle for single transaction funding at a specified retailer for a specified purchase;

notifying, by the prepaid card server and prior to the consumer presenting the payment vehicle to the specified retailer for the single transaction, the prepaid card client that the loaded funds are available for the single transaction with the payment vehicle;

receiving notification from the prepaid card client that the single transaction with the payment vehicle has been completed; and unloading, by the prepaid card server at the completion of the single transaction, remaining funds from the payment vehicle, such that no funds remain with the payment vehicle and the payment vehicle has a zero balance, wherein the unloading is performed independent of whether an authorization for the single transaction is approved or declined;

determining whether a pending payment request exists for the payment vehicle; and upon determining that a pending payment request does not exist for the payment vehicle, unloading, by the prepaid card server, remaining funds from the payment vehicle, such that no funds remain with the payment vehicle.

9. The non-transitory machine-readable medium of claim 8, wherein the unloading remaining funds from the payment vehicle is performed prior to receiving notification from the prepaid card client that the single transaction with the payment vehicle has been completed.

10. The non-transitory machine-readable medium of claim 8, the method further comprising:

generating a report of transactions completed or initiated during a specified period of time.

11. The non-transitory machine-readable medium of claim 8, wherein the single transaction is a purchase of a movie ticket.

\* \* \* \* \*